(No Model.) 3 Sheets—Sheet 1.

W. L. FISH.
BICYCLE OR VELOCIPEDE SADDLE.

No. 499,379. Patented June 13, 1893.

Witnesses
Oscar A. Michel
Chas. R. Michel

Inventor
Warren L. Fish,
By Drake & Co., Atty's (No Model.) 3 Sheets—Sheet 2.

W. L. FISH.
BICYCLE OR VELOCIPEDE SADDLE.

No. 499,379. Patented June 13, 1893.

Witnesses
Oscar A. Michel
Chas. K. Michel

Inventor
Warren L. Fish,
By Drake & Co Atty's (No Model.) 3 Sheets—Sheet 3.

W. L. FISH.
BICYCLE OR VELOCIPEDE SADDLE.

No. 499,379. Patented June 13, 1893.

WITNESSES: Oscar A. Michel. Chas. R. Michel.

INVENTOR: Warren LaFayette Fish.
BY Drake & Co. ATTY'S.

UNITED STATES PATENT OFFICE.

WARREN L. FISH, OF NEWARK, NEW JERSEY.

BICYCLE OR VELOCIPEDE SADDLE.

SPECIFICATION forming part of Letters Patent No. 499,379, dated June 13, 1893.

Application filed October 19, 1891. Serial No. 409,145. (No model.)

*To all whom it may concern:*

Be it known that I, WARREN L. FISH, a citizen of the United States, residing at Newark, in the county of Essex and State of New Jersey, have invented certain new and useful Improvements in Bicycle or Velocipede Saddles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to simplify the construction of bicycle saddles, to reduce the cost of constructing the same, to secure a more easy riding and to obtain other advantages and results some of which will be referred to in connection with the description of the working parts.

The invention consists in the improved bicycle or velocipede saddle and in the arrangements and combinations of parts, substantially as will be hereinafter set forth and finally embodied in the clauses of the claim.

Figure 1:
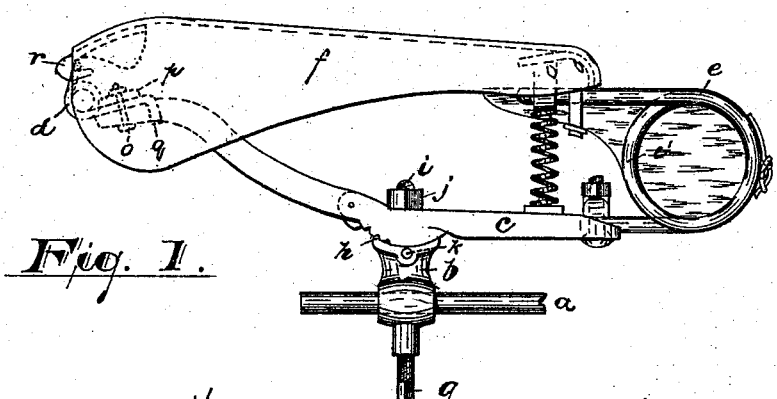
Figure 2:
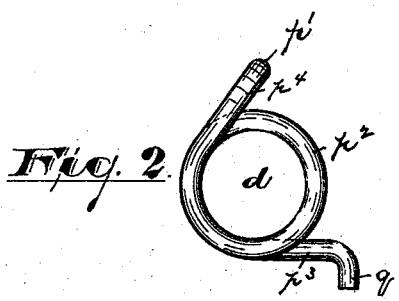
Figure 3:
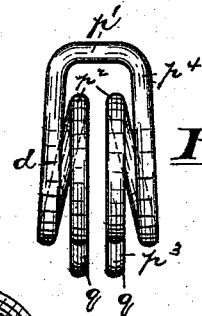
Figure 4:
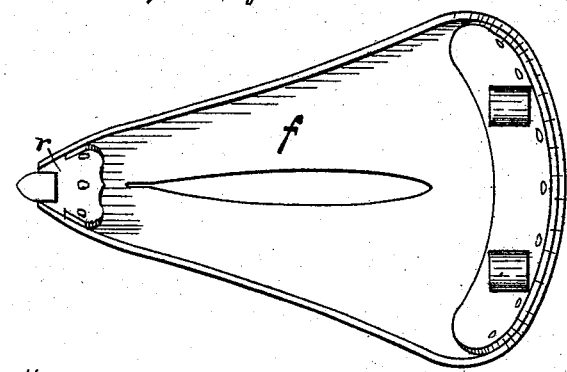
Figure 5:
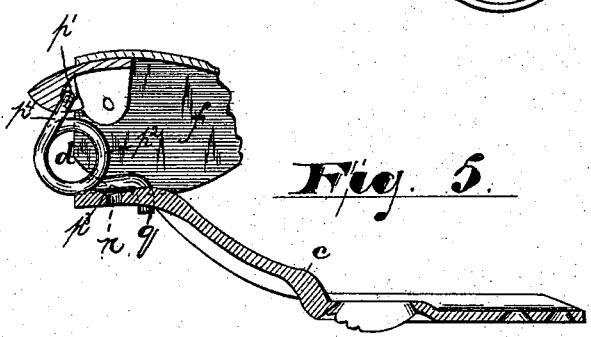
Figure 6:
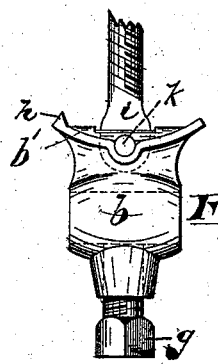
Figure 7:
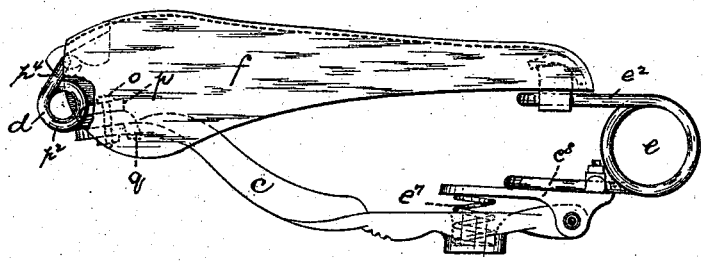
Figure 8:
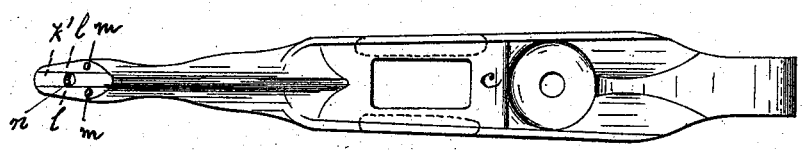
Figures 9, 10:
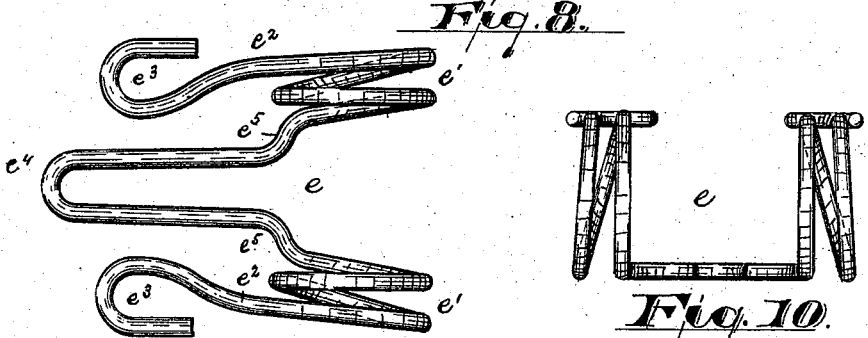
Figure 11:
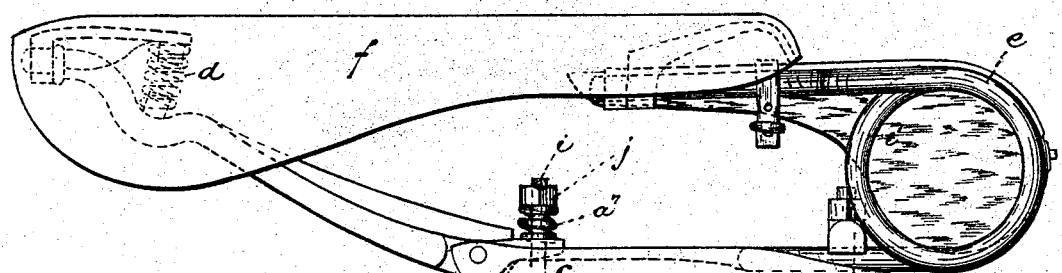
Figure 12:
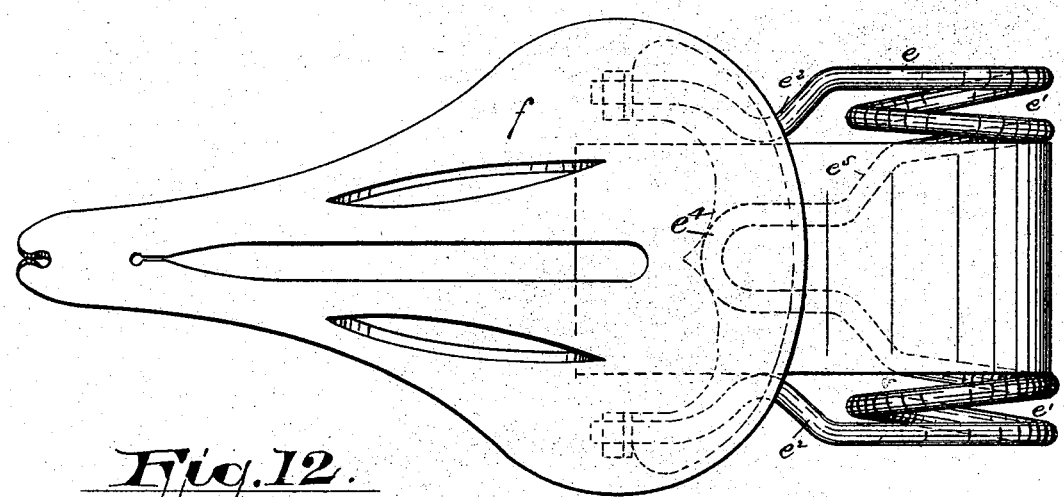

In the accompanying drawings, in which like letters indicate corresponding parts in each of the several views, Figure 1 is a side elevation of the improved saddle. Figs. 2 and 3 are, respectively, a side elevation and a front view of a pommel, horn, or front spring in detail. Fig. 4 is a reverse plan of a saddle seat in detail. Fig. 5 is a central longitudinal section of a stretcher bar and its connections at the pommel of the saddle. Fig. 6 is a detail side elevation of a support or stud adapted to be rigidly secured upon the vehicle frame and to receive the distended saddle seat. Fig. 7 is a detail side elevation of a saddle of modified construction. Fig. 8 is a detail plan of a modified stretcher bar. Figs. 9 and 10 are, respectively, a plan and rear view of the cantle spring, and Figs. 11 and 12 are, respectively, a side view and a plan of a saddle illustrating further varieties or modifications preferred under certain conditions.

In said drawings, $a$, Fig. 1, indicates a suitable supporting bar or L-rod connecting with or forming part of a velocipede frame.

$b$ indicates a stud or base on which the distended saddle seat is supported. This said stud is of cast metal and is thus of a firm and rigid nature so as to prevent forward and backward movement at this point of connection, and is adjustably secured to the frame, or the L-rod thereof. $c$ indicates a stretcher bar supported on and by said stud.

$d$ is the pommel spring and $e$ a cantle spring, both of which are firmly secured to the stretcher bar at opposite ends thereof. The flexible seat, $f$, is suspended to and between said springs after the fashion of a hammock and is held under tension by said springs. The said seat is also provided with ordinary horn or pommel and cantle plates which are fastened to the leather of the seat and give shape and support thereto as will be understood. The stud or base, $b$, is horizontally recessed or perforated to receive the bar or L-rod, $a$, and is provided with a set screw, $g$, or other means for holding the same in place. At the upper end, the said seat is formed on a curve or segment as at, $b'$, to receive or engage a corresponding bearing surface on the stretcher bar. The curve or segmental bearing surface may be provided with a tooth or teeth, $h$, to co-operate with the clamp or binding parts in holding the stretcher bar from slipping or it may be a plain or smooth surface, the former construction being preferred as a cautionary construction. The center part of the stud, $b$, is provided with a recess and into the same is placed the head of the screw bolt, $i$, the shank of which extends upward to pass through the stretcher bar and receive the clamping nuts $j$. The said bolt, $i$, is held in said recess by a pivotal pin, $k$, or other means on which it is allowed a limited forward and rearward movement, when the parts are not clamped together, but the bolt may be rigid. The stretcher bar is slotted to allow the passage of said bolt, $i$, and at each side of the slot is provided with depending segmental or curved bearings corresponding with those on the stud, the said bearings being preferably longitudinal ribs which increase the vertical thickness of the bar where it would otherwise be weak because of the longitudinal slot. By means of the segmental bearings, the angle of the stretcher bar and the seat carried thereby may be changed at will to suit the rider. Said stretcher bar is preferably a cast metal piece, but it may be of spring steel. In this latter case, the curved bearing may be made by bending the rod.

The convexity of the bearing, in the construction shown, is on the stretcher bar, but it is evident that I may reverse the construction and form the concavity on the bar and the convexity on the seat without materially departing from the invention.

From the curved bearing, the stretcher bar extends backward substantially on a horizontal plane and provides a seat or bearing for the cantle spring, and at the opposite side of said curved bearing, it projects upward and forward to receive the pommel spring. The pommel or front spring and its connections are of peculiar construction and are shown in Figs. 1, 2, 3, 7 and 8.

The upwardly extending forward end of the stretcher bar is provided with a longitudinal rib, $k'$, on the opposite sides of which are spring seats $l, l$, and perforations $m, m$, a little way back from the extremity. The said stretcher bar is also provided with a perforation, $n$, for a clamping bolt $o$.

To co-operate with the spring bearings thus described, a clamp plate, $p$, is employed which is held down on the lower tangential arm of the spring $d$, by the said bolt $o$. The said spring, $d$, consists of a wire, doubled, as at $p'$, Figs. 2 and 3, forming two parallel lobes or divisions connected where doubled. Said divisions are coiled at $p^2, p^2$, and at or near the ends of the wire extend tangentially and horizontally as at $p^3$ to form bearings to engage the seats $l, l$. The said ends lie a little apart to receive the rib, $k'$, between and thus any lateral movement is prevented. At the extremities the tangential parts or arms $p^3, p^3$, are again bent either laterally or downwardly as at $q$ to enter suitable recesses, or perforations, such as the perforations $m, m$, and thus the spring is prevented from moving longitudinally on the seat or bearings and from turning or "rolling" sidewise. The upward extending tangential arm $p^4$, providing the connection, $p'$, engages the hook of the pommel or horn plate, $r$, of the saddle seat.

The cantle spring, $e$, and its bearings on the stretcher bar are similar to the constructions in my prior Patent No. 385,606, dated July 3, 1888, excepting that I have changed the shape of the said spring to prevent lateral spreading or the separating of the adjacent coils $e'$, $e'$, Figs. 9 and 10, when pressure is brought to bear on the saddle. Another change in shape has been made to enable the upper surface of the cantle to be brought down nearer to the body of the bearing arms $e^2$ of the cantle spring, or to allow larger coils to be employed without elevating the cantle end of the seat. To this end the hooks $e^3, e^3$, of the arms, $e^2$, are formed or bent so as to lie in horizontal planes as indicated in Fig. 10.

To prevent spreading, the spring is first doubled, as at $e^4$, to provide a bearing on the stretcher bar, then laterally and outwardly bent, as at $e^5, e^5$, to bring the coils closely in horizontal line with the cantle bearings, then coiled as at $e', e'$, and formed into hooks, as before described, or otherwise prepared to receive means to engage the cantle plate as in Fig. 12.

To reduce the rigidity of the stretcher bar, or to allow a little play therein I may joint the bar at or near its connection with the stud or support $b$, a very slight movement at the joint or hinge admitting a sufficient play at the pommel. In connection with the joint, I may provide a spring, $a^7$, to cushion the vertical vibrations.

To relieve the upper arm of the cantle spring, I may and sometimes prefer to employ a supplemental cantle spring, $e^7$, as shown in Fig. 7, and, to this end, I form the stretcher-bar spring-seat on a hinged piece, $e^8$, the one free end of which bears on said supplemental spring, $e^7$, so as to give when undue pressure is brought on the upper arm of the spring $e$, as will be understood.

Having thus described the invention, what I claim as new is—

1. In combination with a flexible saddle seat and pommel or cantle springs a stretcher bar providing bearings for said springs and having between said bearings, a longitudinal slot and, on opposite sides of said slot, segmental ribs serving as bearings and strengthening ribs, and a casting, $b$, providing bearings for the L-rod and a corresponding segmental bearings and means for holding the parts together substantially as and for the purposes set forth.

2. The combination of the support or stud, $b$, having a set screw $g$, recess with a bolt, $i$, working therein, and on opposite sides of said bolt having segmental or curved bearings, a stretcher bar, $c$, having seats at each end for the pommel and cantle springs and having a slot for the bolt $i$, to work in, and on each side of said slot having integral ribs serving to strengthen the said bar and curved to correspond with the curve of the stretcher bar bearings, said springs and a flexible saddle seat, all said parts being arranged and adapted to operate substantially as and for the purposes set forth.

3. The combination with the perforated stretcher bar, pommel plate and saddle seat, a spring, $d$, having the tangential parts $p^3, p^4$, the former of which are provided with laterally downward bends, $q$, to enter perforations in said stretcher bar, and means for holding the said parts together, substantially as and for the purposes set forth.

4. The combination with the perforated and ribbed stretcher bar, of a saddle, of a spring, $d$, having arms or parts, $p^3$, lying on opposite sides of said rib and ends bent to enter the perforations in said bar, and means for holding said parts together, substantially as set forth.

5. The combination with the flexible seat and hooked pommel plate, a spring having helices, $p^2$, connected tangential part $p^4$, tangential parts $p^3$ with turned ends $q$, a stretcher bar, $c$, a clamping plate $p$ and bolt $o$, all arranged and combined substantially as set forth.

6. In a saddle, the cantle spring $e$, having coils $e'$, $e'$, having horizontally hooked upper arms to engage the cantle plate, connected bearings $e^4$ and lateral bends $e^5$ adjacent to said connected bearings, substantially as and for the purposes set forth.

7. In a saddle the combination with the saddle seat $f$, and a stud or support $b$, a stretcher bar jointed at or near said stud or support to admit of a vertical play in said bar, substantially as set forth.

8. In a saddle the combination of a rigid stud or support $b$, a jointed stretcher bar, the vibrations in the parts of which are cushioned by the spring $a^7$ and a bolt for holding the parts together, and a saddle seat, all said parts being arranged and combined substantially as and for the purposes set forth.

9. In combination with the stretcher bar, $c$, piece, $e^8$, hinged thereto at its rear end a spring $e^7$ beneath the free end of said piece, a cantle spring bearing on said hinged piece, and the saddle all substantially as set forth.

In testimony that I claim the foregoing I have hereunto set my hand this 7th day of October, 1891.

WARREN L. FISH.

Witnesses:
CHARLES H. PELL,
OSCAR A. MICHEL.